US011093100B2

(12) United States Patent
Bennett et al.

(10) Patent No.: US 11,093,100 B2
(45) Date of Patent: Aug. 17, 2021

(54) VIRTUAL REALITY DEVICE WITH VARYING INTERACTIVE MODES FOR DOCUMENT VIEWING AND EDITING

(71) Applicant: Microsoft Technology Licensing, LLC, Redmond, WA (US)

(72) Inventors: Michael M. Bennett, Woodinville, WA (US); Gregory C. Hitchcock, Woodinville, WA (US); Jonathan S. Kaufthal, Seattle, WA (US); Akshay Bakshi, Seattle, WA (US); Sean Shiang-Ning Whelan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 15/941,145

(22) Filed: Mar. 30, 2018

(65) Prior Publication Data

US 2019/0278432 A1 Sep. 12, 2019

Related U.S. Application Data

(60) Provisional application No. 62/640,537, filed on Mar. 8, 2018.

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/012* (2013.01); *G06F 3/0484* (2013.01)

(58) Field of Classification Search
CPC .......... G06F 3/0481; G06F 3/01; G06T 11/60; G06T 19/00
See application file for complete search history.

(56) References Cited

U.S. PATENT DOCUMENTS 8,001,476 B2 * 8/2011 Gallo ...................... G06F 9/542
715/742
8,855,719 B2 10/2014 Jacobsen et al.
(Continued)

OTHER PUBLICATIONS

"macOS Sierra: Use Dwell Control", Retrieved From <<https://support.apple.com/kb/PH25153?locale=en_US>>, Mar. 31, 2017, 3 pages.
(Continued)

*Primary Examiner* — Rashawn N Tillery
(74) *Attorney, Agent, or Firm* — Talem IP Law, LLP

(57) ABSTRACT

A virtual reality device can implement varying interactive modes for document viewing and editing by displaying, at an application container level, a current mode view in a view frame of the virtual reality device; and in response to receiving an overview command trigger, determining context, including that the current mode view is at the application container level; expanding to a next level view of, e.g., a task level or an overview level; and displaying, at a next level, the next level view in the view frame of the virtual reality device. The current mode view of the application container level includes a container space of an application and an application container level rule for the container space. Conversely, the virtual reality device can adjust the next level view back to the application container level in response to a focused command trigger and identified region of interest.

20 Claims, 15 Drawing Sheets

(51) Int. Cl.
  *G06F 3/0484* (2013.01)
  *G06F 3/01* (2006.01)

(56) References Cited

U.S. PATENT DOCUMENTS

| | | | | |
|---|---|---|---|---|
| 9,086,785 | B2* | 7/2015 | Chaudhri | G06F 3/0483 |
| 9,152,299 | B2* | 10/2015 | McCann | G06F 3/04817 |
| 9,213,403 | B1* | 12/2015 | Raffle | G06F 3/011 |
| 9,268,404 | B2* | 2/2016 | Clavin | G06F 3/017 |
| 9,500,867 | B2 | 11/2016 | Hennelly et al. | |
| 9,557,892 | B2* | 1/2017 | Miura | G06F 3/0488 |
| 9,656,168 | B1 | 5/2017 | Bear et al. | |
| 9,886,087 | B1* | 2/2018 | Wald | G06F 3/013 |
| 10,007,406 | B1* | 6/2018 | Libin | G06F 3/0484 |
| 2005/0197141 | A1* | 9/2005 | Jiang | G06F 16/955 455/457 |
| 2006/0161847 | A1* | 7/2006 | Holecek | G06F 3/0481 715/716 |
| 2011/0138337 | A1* | 6/2011 | Walter | G06F 8/38 715/853 |
| 2011/0145753 | A1* | 6/2011 | Prakash | G06F 3/0481 715/783 |
| 2014/0109012 | A1* | 4/2014 | Choudhary | G06F 3/0483 715/838 |
| 2014/0111427 | A1* | 4/2014 | Lindley | G02B 27/0093 345/156 |
| 2014/0164893 | A1* | 6/2014 | Pariente | G06F 16/986 715/207 |
| 2014/0282150 | A1* | 9/2014 | Wagner | G06F 3/0482 715/765 |
| 2014/0298254 | A1* | 10/2014 | Peng | G06F 3/0482 715/800 |
| 2015/0346929 | A1* | 12/2015 | Karunamuni | G06F 3/0488 715/777 |
| 2016/0098093 | A1* | 4/2016 | Cheon | G06F 3/0484 345/156 |
| 2016/0139737 | A1* | 5/2016 | Conn | G06F 3/0481 715/802 |
| 2016/0259977 | A1* | 9/2016 | Asbun | A61B 5/165 |
| 2017/0124762 | A1 | 5/2017 | Privault et al. | |
| 2017/0150139 | A1* | 5/2017 | Lee | G06F 3/011 |
| 2017/0221264 | A1* | 8/2017 | Perry | G06F 3/011 |
| 2018/0012408 | A1* | 1/2018 | Gentilin | H04L 67/141 |
| 2018/0082477 | A1* | 3/2018 | Wilde | G06F 3/011 |
| 2018/0101988 | A1* | 4/2018 | Murillo | G06F 3/013 |
| 2018/0121028 | A1* | 5/2018 | Kuscher | G06F 3/0483 |
| 2018/0350119 | A1* | 12/2018 | Kocharlakota | G06F 3/012 |
| 2019/0340816 | A1* | 11/2019 | Rogers | H04L 67/22 |

OTHER PUBLICATIONS

Berard, Francois, "The Perceptual Window: Head Motion as a new Input Stream", In Proceedings of Seventh IFIP Conference on Human-Computer Interaction, Aug. 30, 1999, 8 pages.

Hang, et al., "Panning and Zooming High-Resolution Panoramas in Virtual Reality Devices", In Proceedings of 30th Annual ACM Symposium on User Interface Software and Technology, Oct. 22, 2017, pp. 1-10.

* cited by examiner

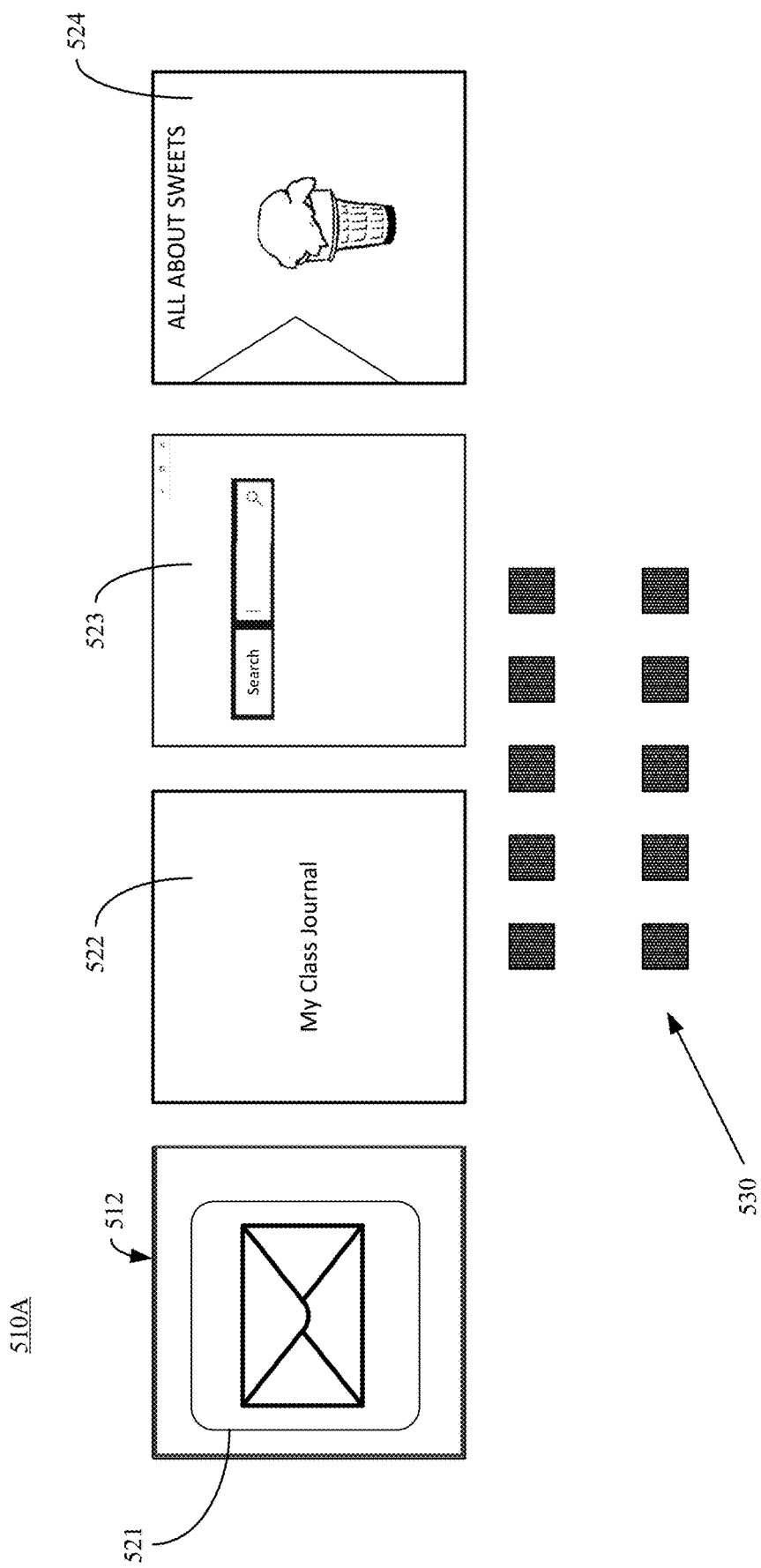

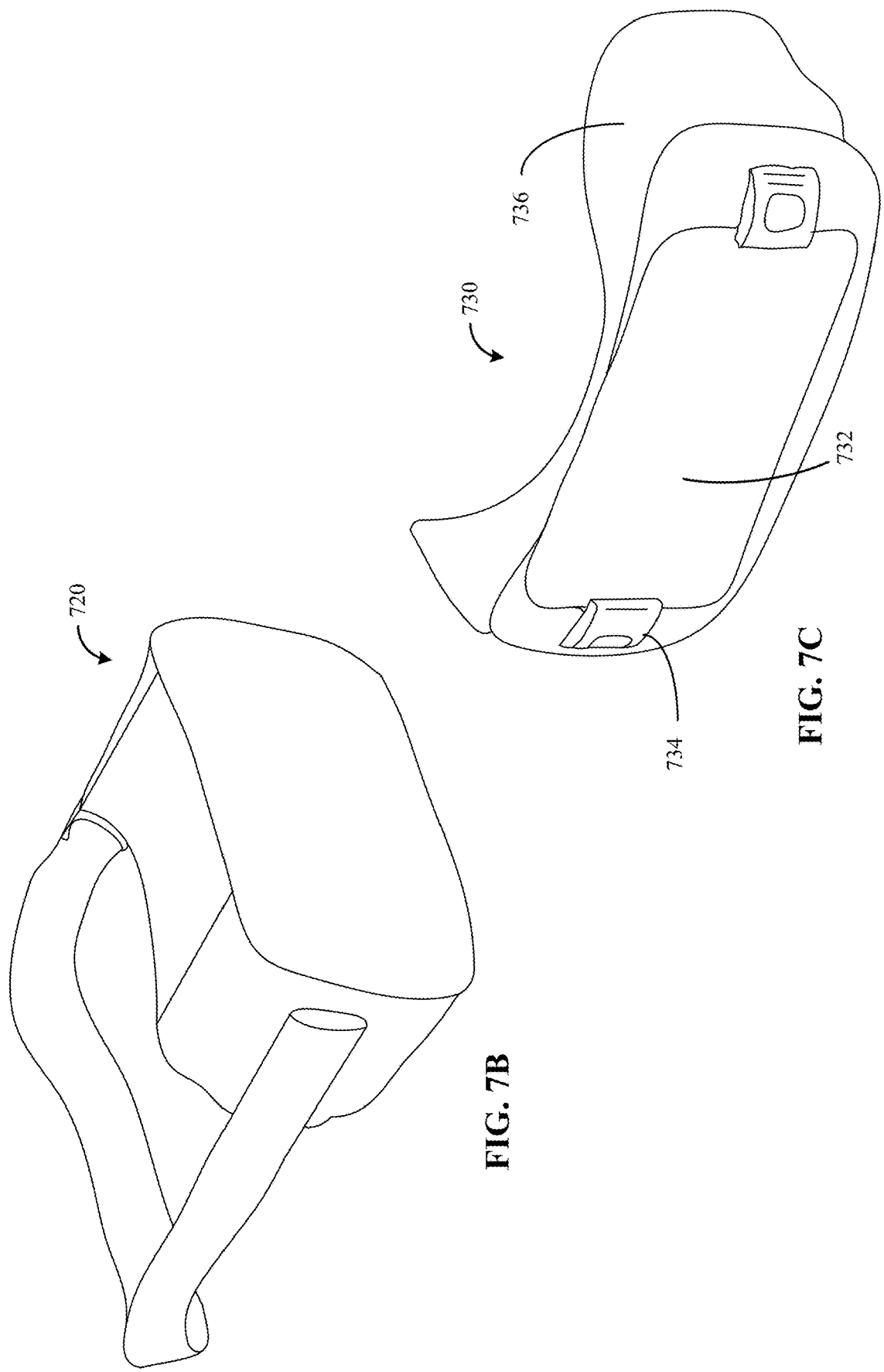

VIRTUAL REALITY DEVICE WITH VARYING INTERACTIVE MODES FOR DOCUMENT VIEWING AND EDITING

CROSS REFERENCE TO RELATED APPLICATION(S)

This application claims the benefit of U.S. Provisional Patent Application Ser. No. 62/640,537, filed Mar. 8, 2018.

BACKGROUND

Virtual reality and the various levels of immersion into a virtual environment, including augmented and mixed reality scenarios, are being implemented for numerous applications, including medical or military training, games, and travel exploration. Increasing attention is being made to productivity applications to enable users to engage in office work.

Virtual reality refers to a fully immersive, computer-generated experience. For example, a user can put on a headset, and everything in the user's field of view is a pixel. In comparison, augmented reality and mixed reality include experiences in which reality is supplemented with additional information such as available on a heads-up display, overlay, or on a mobile device. Augmented reality and mixed reality are similar, but mixed reality takes augmented reality one step further so that not only is the real world and the digitally represented world available, the digitally represented objects interact with the real-world element. For example, holograms can be rendered in the real world and appear to interact with objects in the physical world.

BRIEF SUMMARY

Virtual reality (VR) devices with multiple viewing modes to accommodate a user's work context are described.

A VR device can implement varying interactive modes for document viewing and editing. A VR device can display a current mode view in a view frame of the virtual reality device, the current mode view comprising a current mode rule for a container space (e.g., when certain applications, if any, are put to sleep to minimize power consumption), wherein the container space comprises an application container of an application. Then, in response to receiving an overview command trigger, the VR device can determine context including a current container level. When the current container level can expand at least one level, the VR device expands to a next mode view, wherein the next mode view is a next expanded container level and applies a next mode rule for the container space. In response to receiving a focus command trigger and identifying a region of interest, the VR device can adjust the view frame to the region of interest, display a focused mode view, and apply a focused mode rule for the container space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 5A-5I illustrate an example scenario of using a VR device with varying interactive modes for document viewing and editing.

FIGS. 7A-7C illustrate example head-mounted display-based VR devices that may be used in certain implementations described herein.

DETAILED DESCRIPTION

Figure 1A:
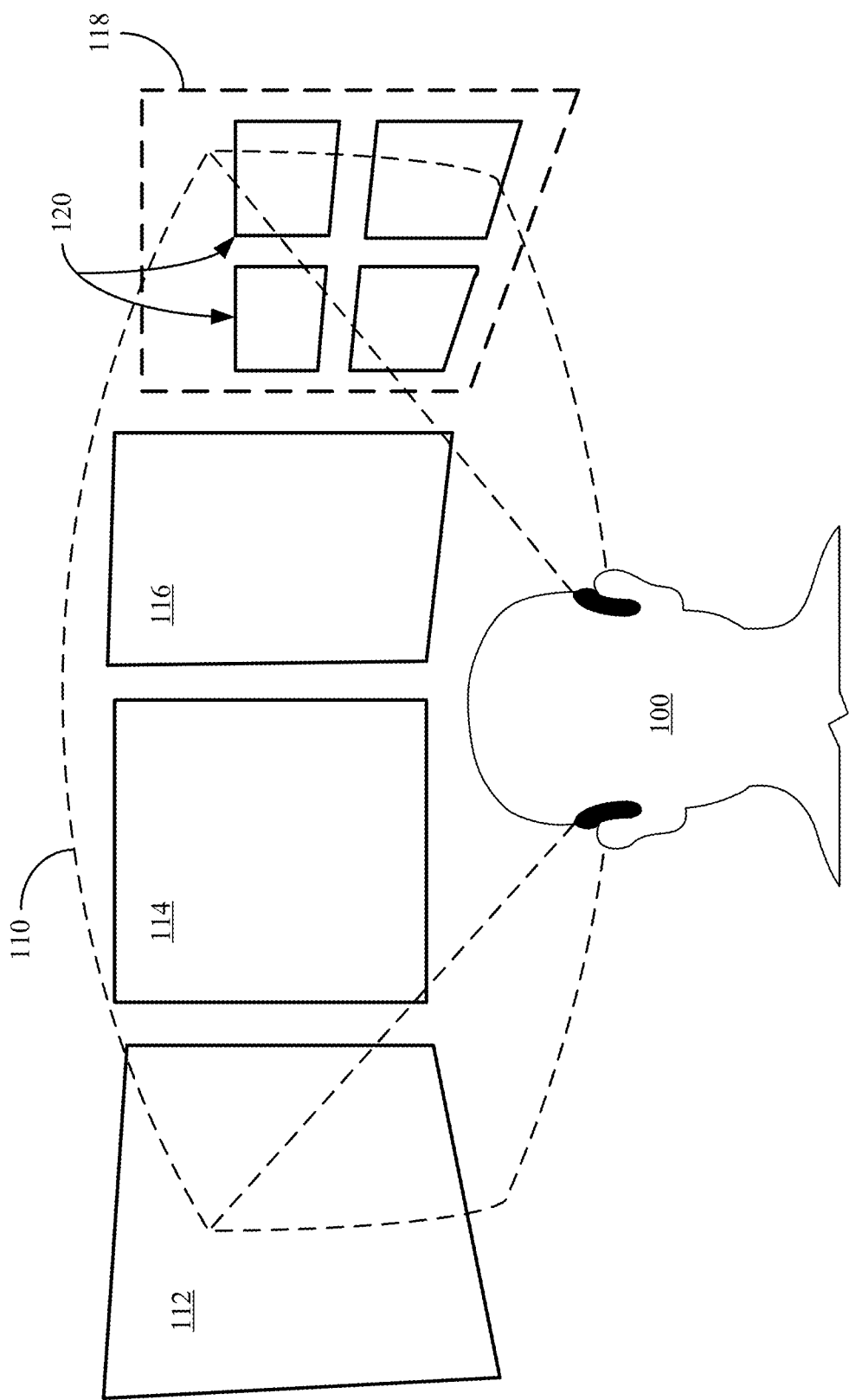
FIGS. 1A and 1B illustrate example VR scenarios for applications in which implementations of the described varying interactive modes can be applied.

Virtual reality (VR) devices with multiple viewing modes to accommodate a user's work context are described. VR devices such as VR headsets, holographic-enabled headsets, and other head mounted displays can be used to implement virtual reality, mixed reality, and augmented reality applications, including productivity applications. In some implementations, the described VR devices and techniques can enable a user to perform difficult productivity tasks using a portable wireless device and VR headset.

One challenge for using a VR device to engage in information work using a typical office paradigm with multiple monitors and windows is the available resolution for viewing and interacting with text. Indeed, text quality can suffer due to lenses that spread a display over a wide field of view. In addition, gestural and eye tracking inputs may not provide the accuracy and high-speed input expected when inputting and editing text. productivity tasks such as spreadsheet editing can require fine control of mapping gestures to actions and a high-resolution image to view the content of the cells of the spreadsheet.

The described techniques and systems are applicable for supporting interaction with multiple applications and objects in a virtual reality environment. The applications may be media applications (e.g., videos, television, movies), gaming applications, and productivity applications. Productivity applications include content creation and content consumption applications including, but not limited to, word processing applications, spreadsheet applications, presentation applications, note-taking application, whiteboard applications, email or messaging applications, drawing applications, web browser applications, search and research applications, and reader applications.

The described VR devices and techniques use work context, controls and head movement tracking to support intense document creation. In some cases, the described VR devices and techniques support the integration of keyboard and mouse (or touchpad/trackpad) interactions. In some cases, such as when using devices that support mixed reality applications, both the keyboard (with user hands) and the virtual display can be viewed by the user.

The described techniques support switching between documents (and applications), as well as being able to get an overview of all documents that are open, looking around, and then focusing back on a specific task. The described techniques maintain the expected spatial relationships for the user so that the user does not lose track of where things are in the environment around them.

An activation trigger for switching modes can include a combination of attention and selection. For example, head tracking ('attention') and a keyboard, mouse, controller, voice, or gestural command ('selection') can be used to enter a focused mode. For both a focused mode and an overview mode, the modes can be initiated by a command selection (e.g., from a menu or icon), which may be verbal, gestural, touch, a selection of one or more keys of a keyboard, or mouse button. In some cases, the activation can be triggered automatically based on, for example, detecting high priority changes at a different level of activity.

Figure 1B:
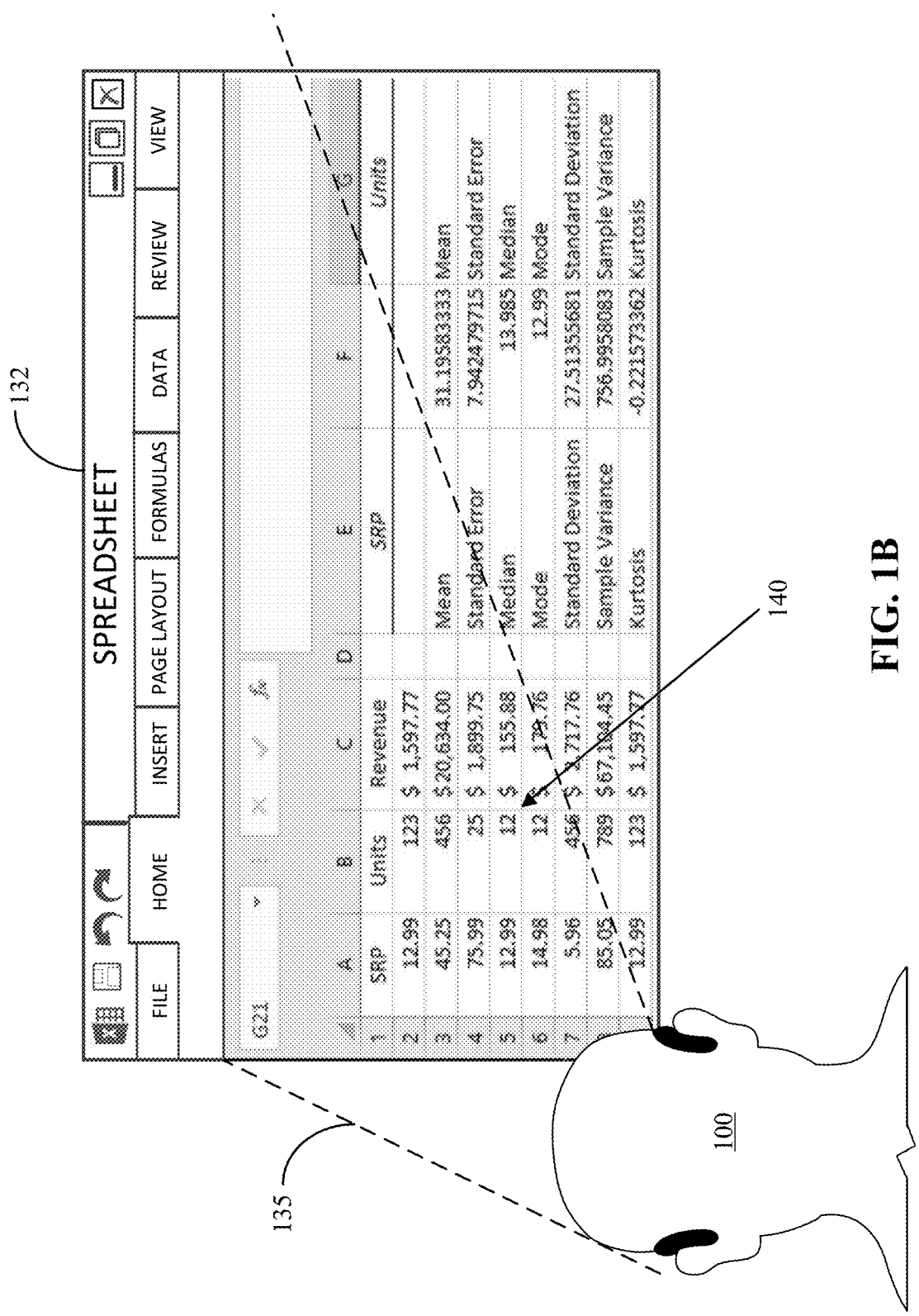

FIGS. 1A and 1B illustrate example VR scenarios for applications in which implementations of the described varying interactive modes can be applied. Referring to FIG. 1A, a user 100 can be working with one or more applications in a virtual reality environment 110. The content of the virtual reality environment 110 that a user is able to see in front of them can be referred to as a "view frame"—the boundary of the display. Since a virtual reality environment 110 may effectively surround the user 100, the view frame is considered the area of the environment that the user can see at a given time. The user 100 can be interacting with the one or more applications to, for example, consume or create content, or communicate with others. In this example, the virtual reality environment has four documents 112, 114, 116, and 118, where the document 118 includes slides 120. In the virtual reality environment 110 the system maintains spatial relationships between the documents so that the user 100 knows that, for example, the slides 120 are on the right and other documents 112, 114, and 116 can be viewed as the user 100 turns their head to the left (or selects an arrow to move the view to the left or selects some other user interface element or uses an input device element like an arrow key of a controller or keyboard).

Referring to FIG. 1B, as mentioned above, performing complex productivity tasks such as spreadsheet editing can require a high-resolution experience in a virtual reality environment. Here, the user 100 can activate an interactive mode corresponding to a focused mode such that a spreadsheet 132 can be provided with appropriate resolution in a view frame 135. Then, the user 100 can interact with the cells 140 with better user interaction performance and improved user efficiency. For example, the improved text display can improve user efficiency and improve user interaction performance with the small elements. The different interactive modes may enable a user to move between an application container level, a task level, and an overview level while maintaining the spatial relationships between documents or other objects in the virtual reality environment.

Figure 2A:
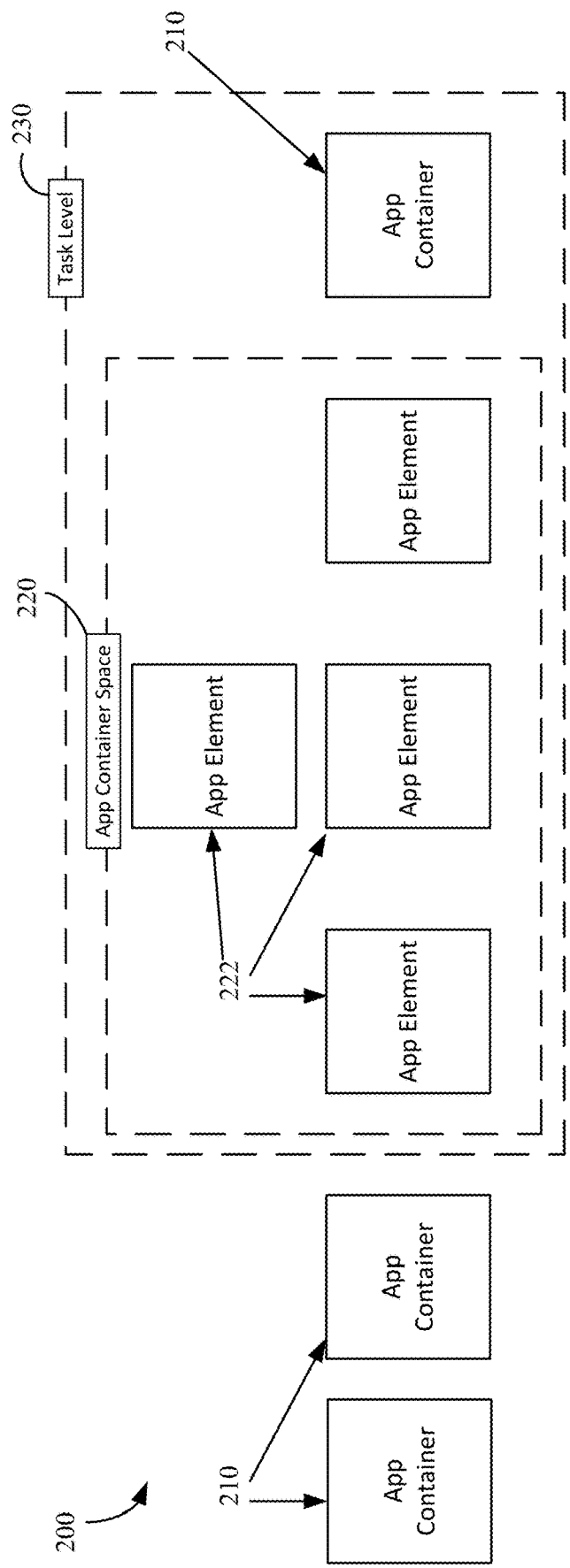
FIGS. 2A and 2B illustrate example application container level, task level, and overview level configurations for document viewing and editing.
Figure 2B:
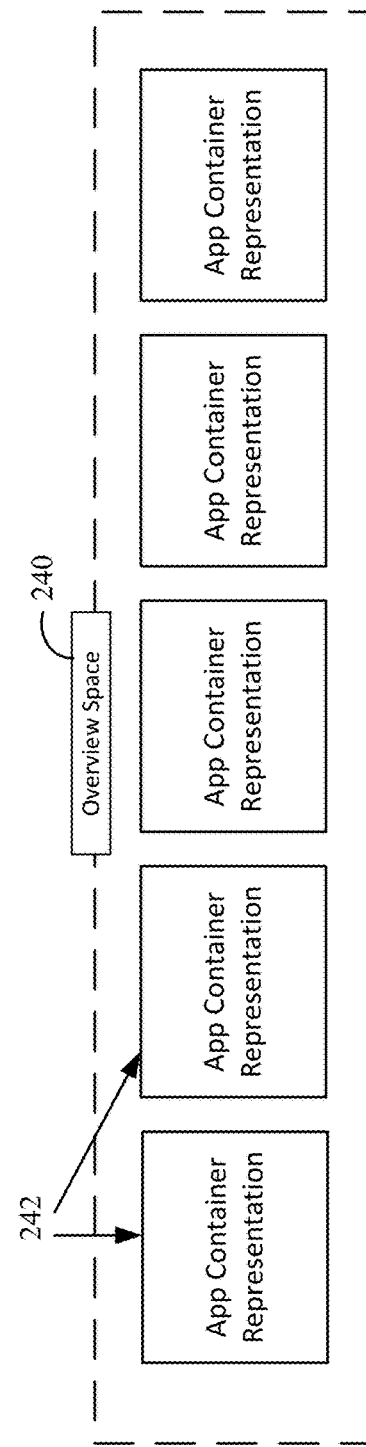

FIGS. 2A and 2B illustrate example application container level, task level, and overview level configurations for document viewing and editing. Referring to FIG. 2A, a virtual reality environment 200 can include a plurality of application containers (e.g., 210). Each application container provides a space in which appropriate graphics can be rendered for an application. An application container can be considered to operate within an application container space 220. The application container space 220 provides an area, or interface, for interaction with the application. In some cases, multiple application container elements 222 can be provided within the application container space 220. The application container space 220 can thus include one or more application container elements 222 that can support graphics for the same application (and/or document). For example, the document 118 in FIG. 1A can include the multiple slides 120 arranged in the application container space for that document 118. Each of the slides 120 operate in an application container element.

When the current mode is an application container level mode, a user can have a current mode view of an application container level view with the view frame on the application container space 220 (and which a user may fix within the view frame or permit change of view to another application container space in the virtual reality environment). This is shown in FIG. 1B, where the user 100 has an application container space with the spreadsheet 132 in the view frame 135.

The current mode view of the application container level view (e.g., where the application container space is expanded in the view frame) can include a current mode rule for the container space of operating the application within the application container space and stopping operation of any applications in spaces not in the view frame (e.g., the other applications, not visible, "sleep").

In some cases, more than one application or more than one document is beneficial for performing a particular task. Accordingly, certain application containers, each operating within their corresponding application container space, can be grouped and assigned as a task level 230. The current mode view of the task level view (e.g., where there are at least two application container spaces of the same or different applications) can include a current mode rule for the container space of operating the corresponding application within each of the at least two application container spaces and stopping operation of any applications in spaces not in the view frame determined based on head motion (e.g., the other applications "sleep").

As described herein, in addition to having a focused mode and supporting the spatial relationships between application containers, an overview level is provided. Referring to FIG. 2B, the overview level generates an overview space 240 that provides a view of all application container spaces 220 in the view area. The overview level can further include overview mode rules, such as replacing active elements or event content dense graphics within an application container space 220 with representations (e.g., application container representations 242). For example, operations of any applications within the application container spaces can be reduced or stopped, which can reduce power consumption. Reduce power consumption may be achieved, in part, due to reduced processor load for running the applications. Thus, even when all windows are in the user's field of view, unless the system is in a focused mode (with an application container space or task level space in the field of view), a reduced resolution video or image can be provided in the active window or a thumbnail or representational image can be provided in place of an active window. Advantageously the commands provide improved usability of applications, including productivity applications, in the VR environment.

In some cases, thumbnail representations can replace the graphics in the application container spaces. Accordingly, the application containers shown in the overview include graphics for an application container representation. In some cases, the overview space 240 can maintain certain spatial relationship characteristics between application containers so that a user can see that a particular application container is to the left or right (or above or below or in front or in back of) another application container.

While in the various modes, additional rules may be implemented to control whether or not the user's head movement will affect the view frame. For example, a head lock command and a world lock command may be provided. In response to a head lock command, the system can maintain the view frame regardless of head position of the user; and in response to a world lock command, the system can maintain the container space within the view frame while permitting head motion tracking within the container space. Conceptually, a virtual object may be locked to a reference location in the real-world environment such that the location of the virtual object remains constant relative to the real-world environment regardless of the position or angle from which it is viewed. When a head lock command is instantiated, a virtual object may be locked to the position and direction of a user's head such that the location of the virtual object in a user's field of view appears fixed regardless of a direction in which the user faces. Head-locking may be used, for example, to display persistent user interface icons in the user's field of view, such as a mouse graphic. Head-locking can be used as a way to reduce battery consumption as an inertial measurement unit can be turned off during the head-lock scenario. In some cases, the head-locking can be used to help improve visual clarity and enable a user to move to a comfortable position without having the text or graphics move around. In the described world lock scenario, the fixed space is the application container (or multiple application containers if in a task level view), and the virtual objects can remain constant relative to the environment of the application container, but the application container is locked to boundary positions of the user's head and orientation.

Figure 3A:
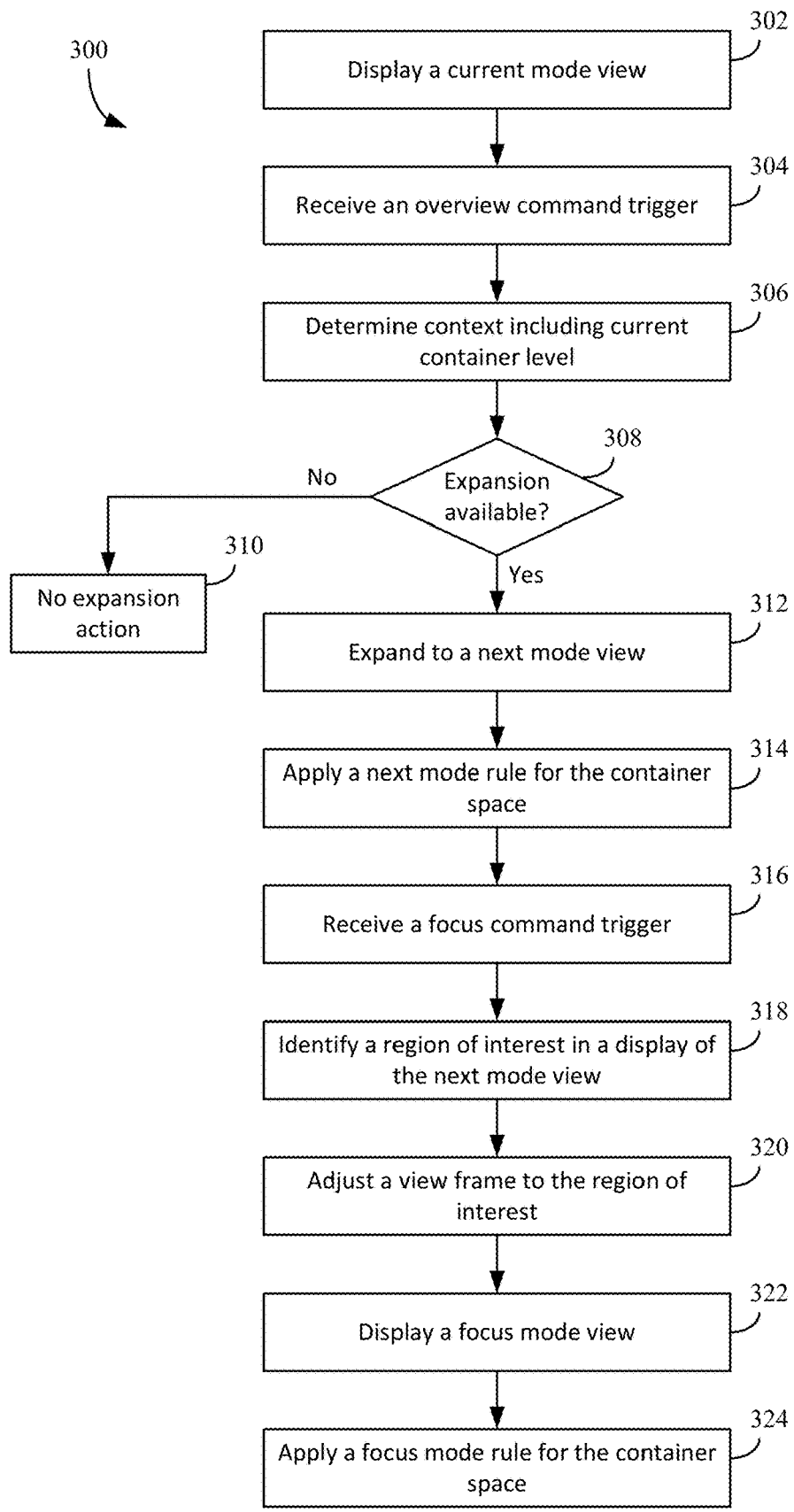
FIGS. 3A and 3B illustrate example processes for varying interactive modes for a VR device.
Figure 3B:
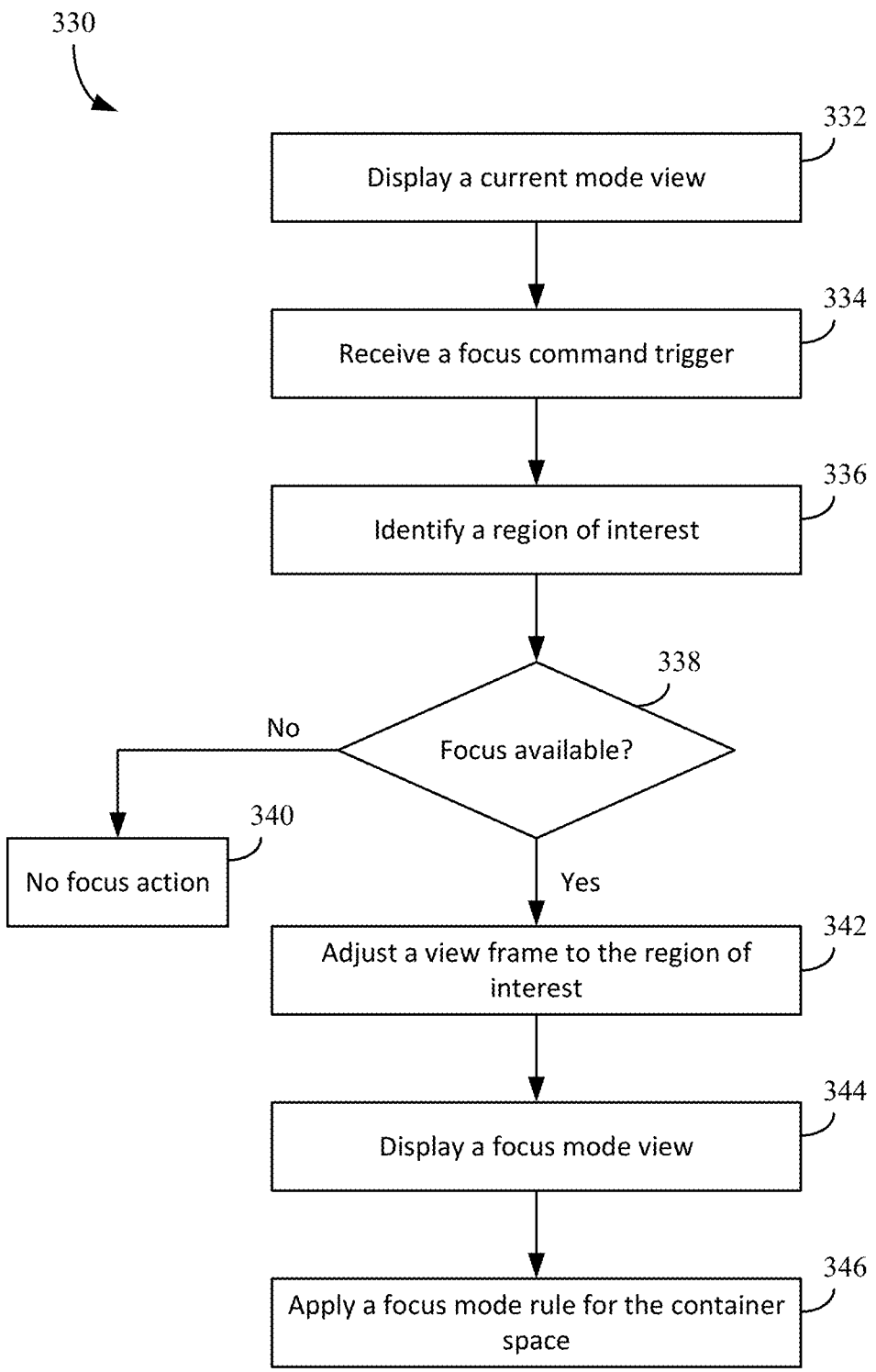

FIGS. 3A and 3B illustrate example processes for varying interactive modes for a VR device. Referring to FIG. 3A, a VR device can perform process 300 for varying interactive modes for document viewing and editing. The VR device can display a current mode view (302). The current mode view can include the content of a display area and enforce certain rules (the "current mode rule") for container spaces such as the application containers 210 described with respect to FIGS. 2A and 2B. The system can receive an overview command trigger (304). The overview command trigger can be any suitable activation trigger. For example, the overview command trigger can be a specific one or more keys on a keyboard, a selection of a command icon from a menu, a verbal command, or a particular gesture. When an overview command trigger is received, the system can determine context including the current container level (306). The context can further include, but is not limited to, the content in the view space, the applications running in the environment, and the corresponding application states for each of those applications. A determination can be made, using the current container level information, whether expansion is available (308). If there is no next level available, no expansion action is taken (310). If there is a next level available, the system will expand to a next mode view (312); and will apply a next mode rule for the container space (314).

In some cases, there are two modes: a regular operating mode and the overview mode. The regular operating mode may be the virtual reality environment such as illustrated in FIG. 1A or the virtual reality environment such as illustrated in FIG. 1B. Thus, in response to receiving the overview command trigger, if the system is in a regular operating mode, the system will then move to the overview mode view but if the system is already in the overview mode, no action is taken. In some cases, there are more than two modes. For example, in the illustrative implementation described herein, there are three modes available: one for application container level, one for task level, and one for the overview level. In some cases, the overview command trigger automatically moves the current mode view to the overview mode view regardless of what level view is the current mode view. In some cases, the overview command trigger is used to move sequentially through the levels.

The system can receive a focus command trigger (316). The focus command trigger can include a keyboard, mouse, controller, audio, or gestural command. In addition to the focus command trigger, a region of interest is identified in the display of the next mode view (318). The region of interest may be identified by performing head tracking and detecting head position. In some cases, a mouse or gestural selection may be used to identify the region of interest. Although the identifying the region of interest is shown subsequent to receiving the focus command trigger, the processes may be performed in any order and even at the same time. The combination of the focus command trigger and the identified region of interest (the "attention") can cause the modes to be switched, for example, by adjusting a view frame to the region of interest (320); displaying a focus mode view (322); and applying a focus mode rule for the container space (324).

In the case where there are more than two modes, the focus command trigger can automatically move the next mode view (e.g., the overview mode view or the task mode view for the three-mode implementation) to the application container level or may move the modes sequentially through the levels.

In more detail, referring to FIG. 3B, a VR device can perform process 330 for varying interactive modes for document viewing and editing. The VR device can display a current mode view (332). The current mode view can include the content of a display area and enforce certain rules (the "current mode rule") for container spaces such as the application containers 210 described with respect to FIGS. 2A and 2B. The system can receive a focus command trigger (334). The focus command trigger can include a keyboard, mouse, controller, audio, or gestural command. In addition to the focus command trigger, a region of interest is identified in the display of the current mode view (336). The region of interest may be identified by performing head tracking and detecting head position. In some cases, a mouse or gestural selection may be used to identify the region of interest. Although the identifying the region of interest is shown subsequent to receiving the focus command trigger, the processes may be performed in any order and even at the same time.

When the focus command trigger is received, the system can determine context (e.g., current container level, application, application state, content); and a determination can be made as to whether a focus mode is available (338). If there is no focus available, no focus action is taken (340). If there is a focus available, the system will adjust a view frame to the region of interest (342); display a focus mode view (344); and apply a focus mode rule for the container space (346).

As described above, in some cases, there are two modes: a regular operating mode and the overview mode. The regular operating mode may be the virtual reality environment such as illustrated in FIG. 1A or the virtual reality environment such as illustrated in FIG. 1B. Thus, in response to receiving the focus command trigger, if the system is in a regular operating mode (where regular operating mode is a focus mode), no action is taken, but if the system is in the overview mode, the system will then move to the focused mode view. In some cases, where there are more than two modes, the system may automatically move the current mode view to the focused mode view regardless of what level view is the current mode view or may move the system sequentially through the levels.

In some cases, when moving from overview level to the task or application container level, the focused command trigger can also cause the application (in the application container of interest) to launch.

Figures 4A, 4B:
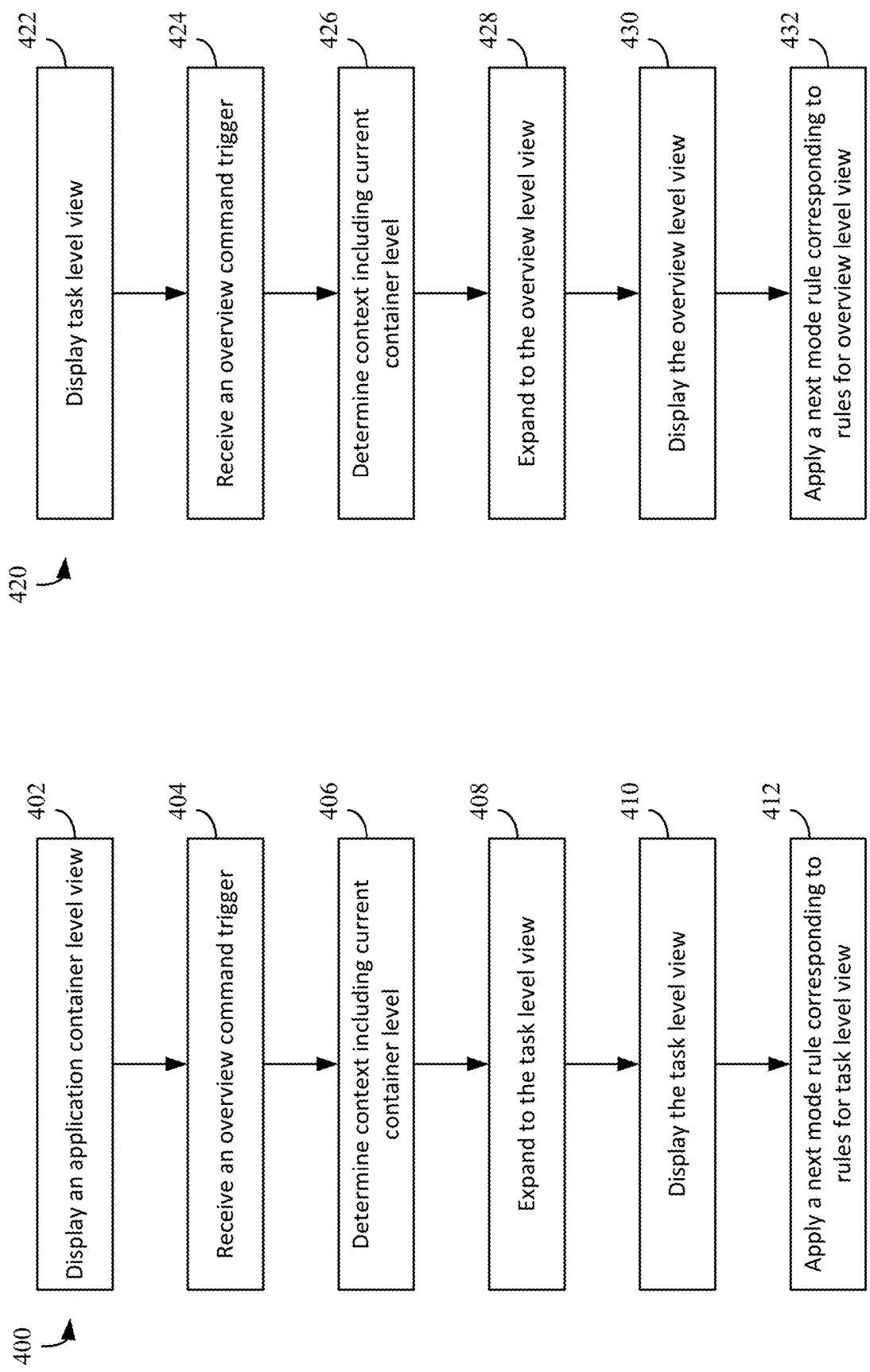
FIGS. 4A-4D illustrate example processes for moving between interactive modes having application container level, task level, and overview level configurations for document viewing and editing.

FIGS. 4A-4D illustrate example processes for moving between interactive modes having application container level, task level, and overview level configurations for document viewing and editing. Referring to FIG. 4A, in process 400, an application container level view may be displayed in a VR device environment (402). The system can receive an overview command trigger (404); and determine context including current container level (406). Because the current container level is the application container level, the system can expand to the task level view (408); display the task level view (410); and apply a next mode rule corresponding to rules for the task level view (412).

Referring to FIG. 4B and process 420, a task level view may be displayed in a VR device environment (422). The system can receive an overview command trigger (424); and determine context including current container level (426). Because the current container level is the task level, the system can expand to the overview level view (428); display the overview level view (430); and apply a next mode rule corresponding to rules for the overview level view (432).

Figure 4D:
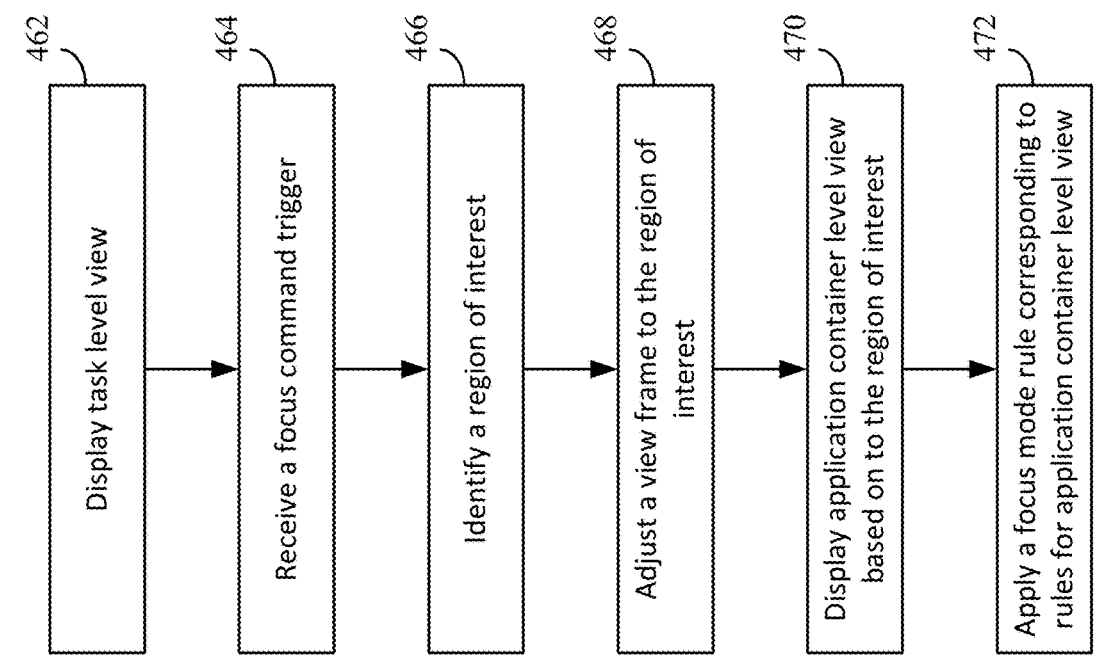
Figure 4C:
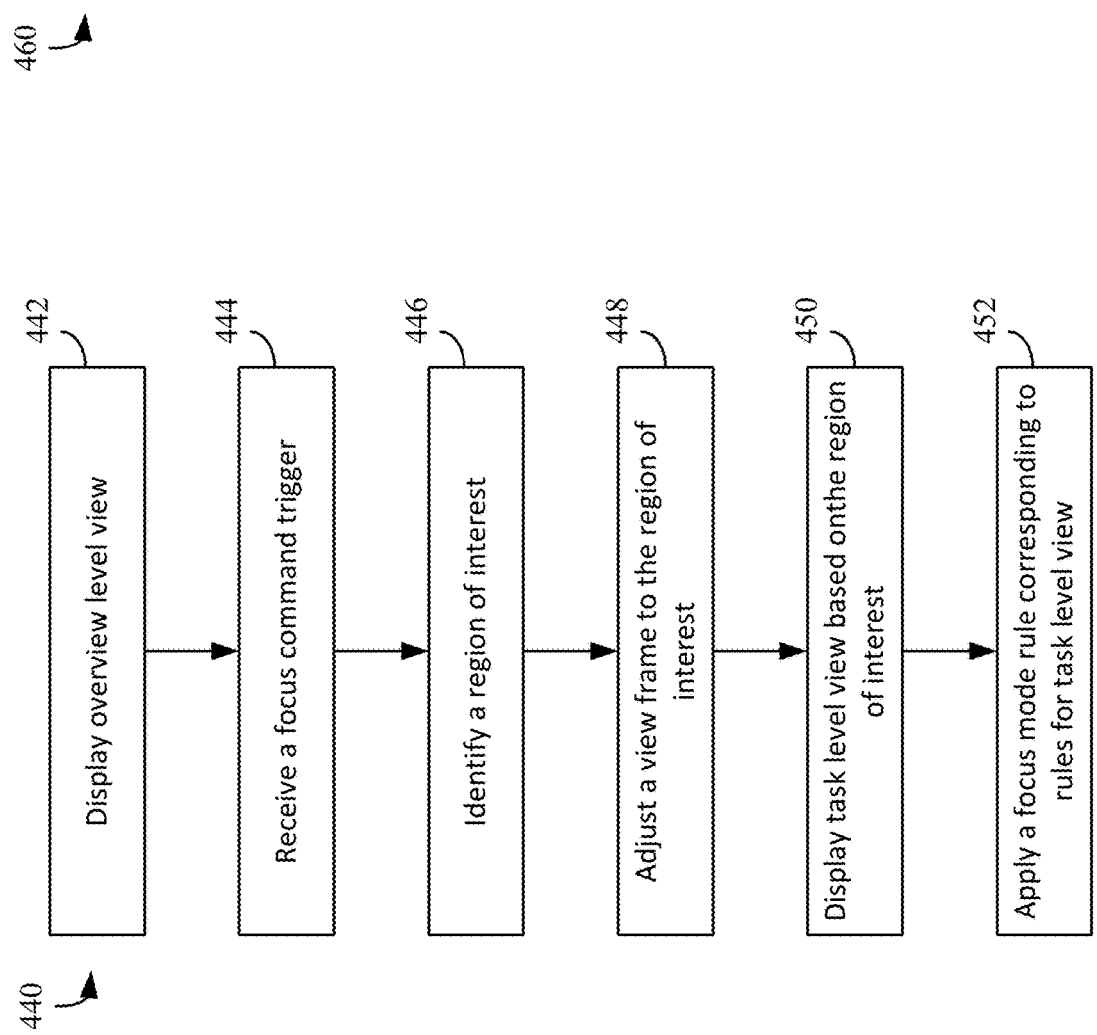

Referring to FIG. 4C, in process 440, an overview level view may be displayed in a VR device environment (442). The system can receive a focus command trigger (444); and identify a region of interest (446). Because the current container level is the overview level view, the system can adjust the view frame to the region of interest (448); display the task level view based on the region of interest (450); and apply a focus mode rule corresponding to rules for the task level view (452).

Referring to FIG. 4D, in process 460, a task level view may be displayed in a VR device environment (462). The system can receive a focus command trigger (464); and identify a region of interest (466). Because the current container level is the task level view, the system can adjust the view frame to the region of interest (468); display the application container level view based on the region of interest (470); and apply a focus mode rule corresponding to rules for the application container level view (472).

It should be understood that, in some cases, the task level view may be the same as an application container level view, for example, where a single application or document is utilized for a particular task.

FIGS. 5A-5I illustrate an example scenario of using a VR device with varying interactive modes for document viewing and editing.

Figure 5A:
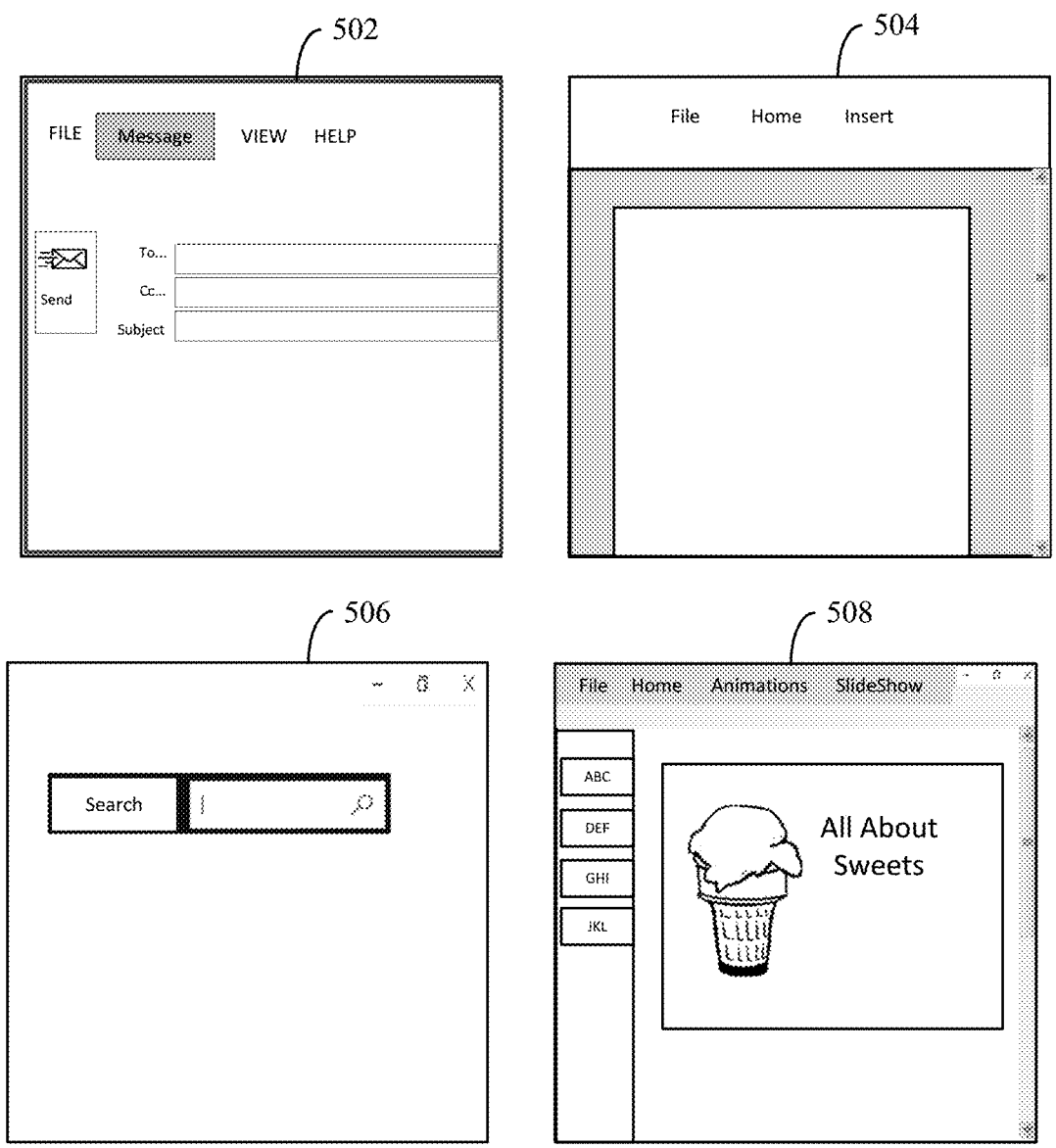

Referring to FIG. 5A, a user of a virtual reality device may be carrying out tasks using a plurality of applications, some of which may be productivity applications. FIG. 5A shows an example of application containers for the illustrative scenario. Here, one application container is for an email application and displays a document of an email message 502; one application container is for a word processing application and displays a document of a docx file 504; one application container is for a web browser application and displays a document of a page of a search engine 506; and one application container is for a presentation application and displays a document of a presentation file 508. Although the application containers are shown each including a different application, multiple application containers can be provided for a same application, but different documents.

Referring to FIG. 5B, an example of an overview level view is provided. The four application containers in the VR environment are shown in the view frame 510A using container representations 512. Here, representation 521 is used for the email message 502, representation 522 is used for the content 504, representation 523 is used for the webpage 506, and representation 524 is used for the presentation file 508. In some cases, the representation may be a graphic image to represent the content, a thumbnail image of document, or a label (e.g., what the file is named or some other label or identifier for the underlying document/content). Also shown in the view frame are additional interactive elements 530. The additional interactive elements 530 may include command icons or other content.

Figure 5C:
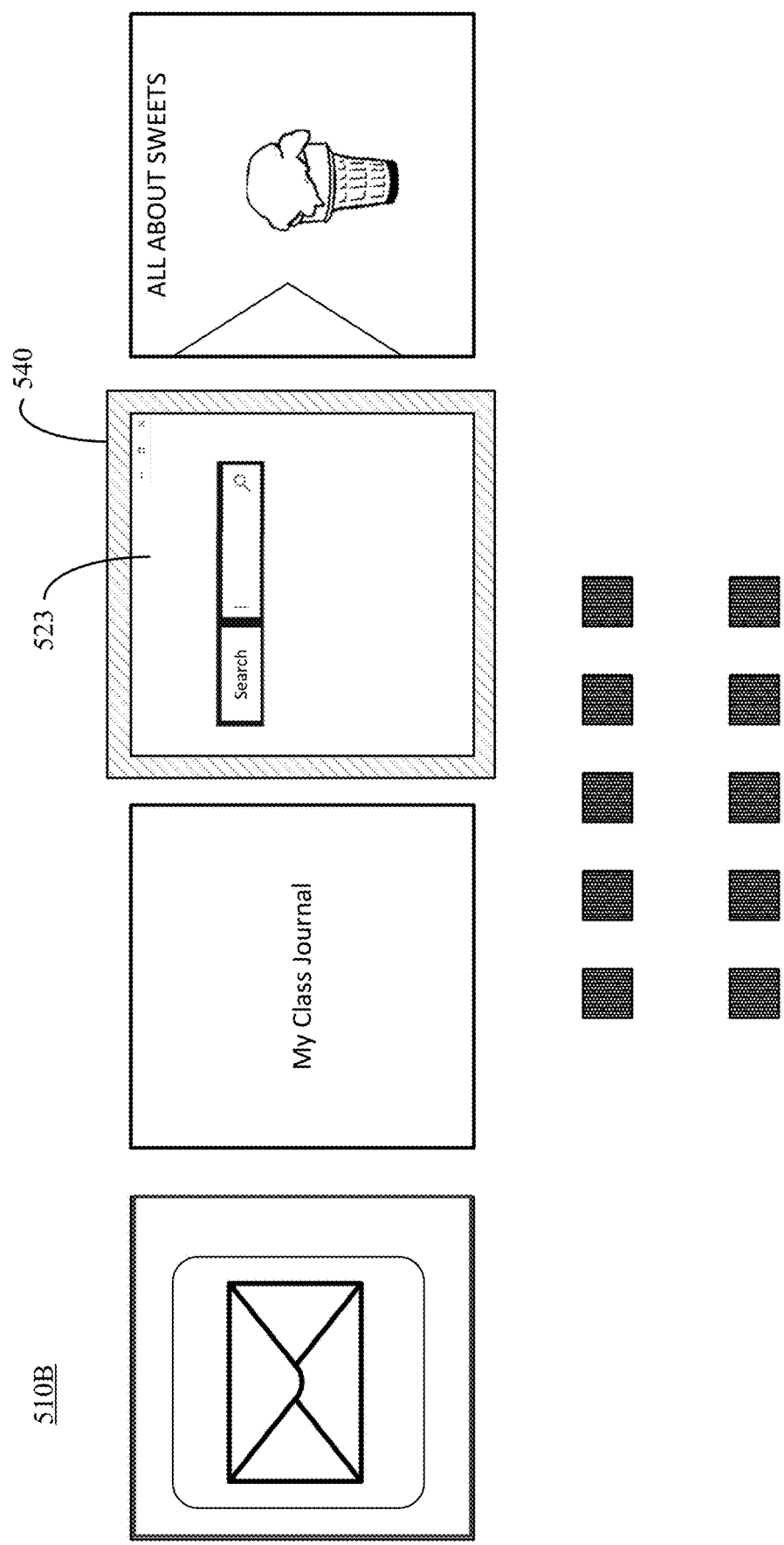
Figure 5D:
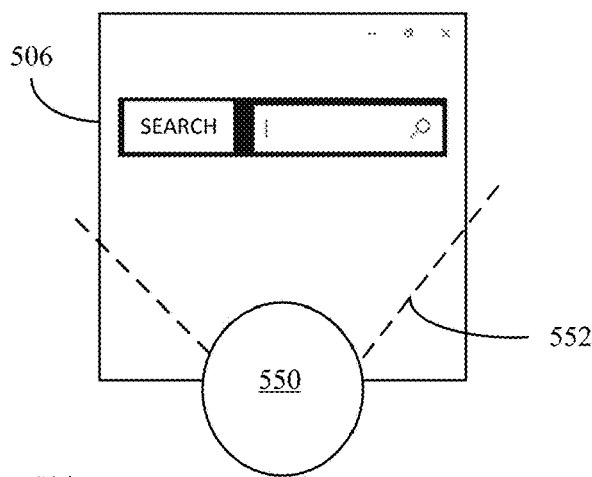
Figure 5E:
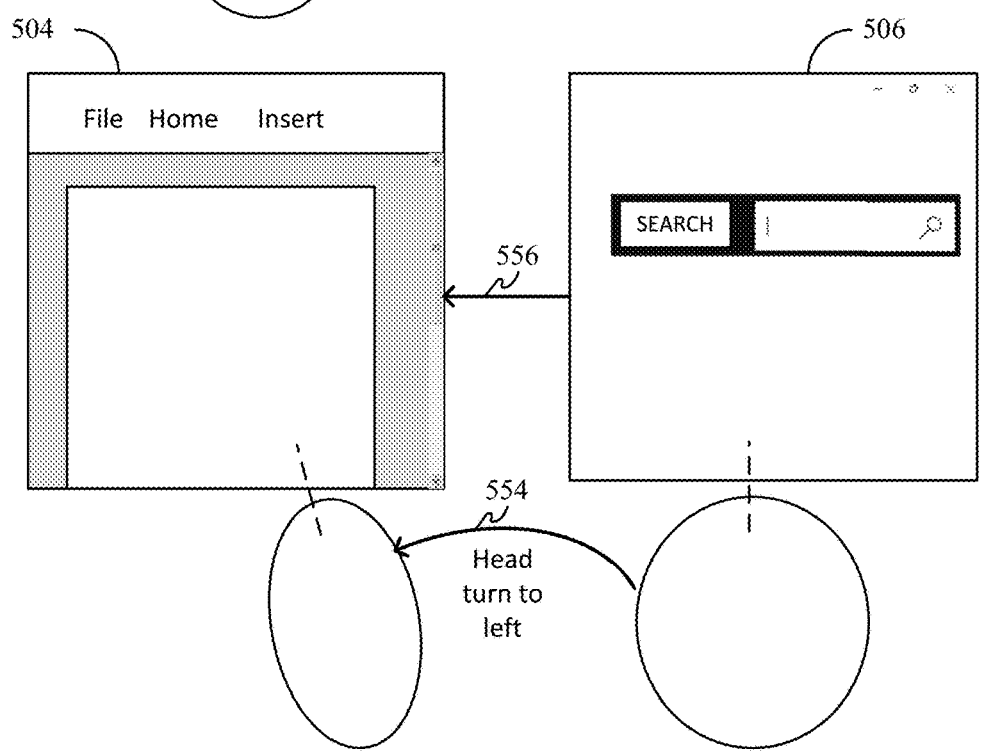
Figure 5F:
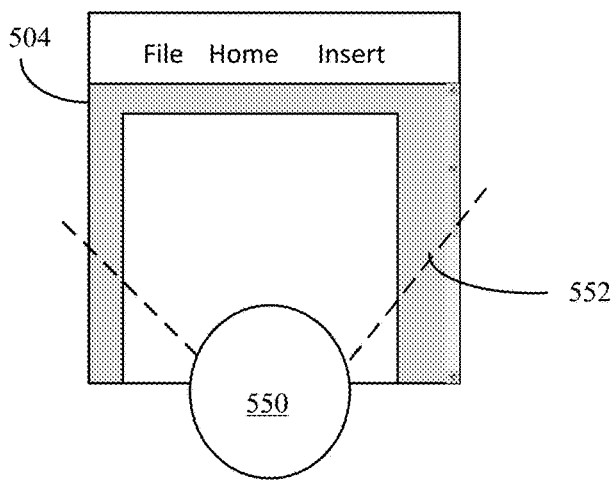

Referring to FIG. 5C, a user may indicate their selection of a region of interest. The system may identify the region of interest based on the user's head motion and position, or some other input. In the view frame 510B, the user has indicated their interest in web browser, and the virtual reality device can provide a representation of the machine state indicating that the web browser is the identified region of interest, for example by providing a signal to indicate to a user the identified region of interest. Here, the example of the signal is a highlight 540 for the representation 523. In response to receiving both a focus command trigger and identifying the region of interest, the system can adjust the view frame to the region of interest. For example, as shown in FIG. 5D, the webpage 506 is provided to the user 550 as an application container level view in the view frame 552. While at the application container level, the user 550 may navigate in the virtual reality environment to view the other application containers. For example, referring to FIG. 5E, a user 550 may turn (554) their head to the left and change (556) the view frame from the webpage 506 to the document 504, such that the application container space for document 504 is in the user's view frame 552 as shown in FIG. 5F.

Figure 5G:
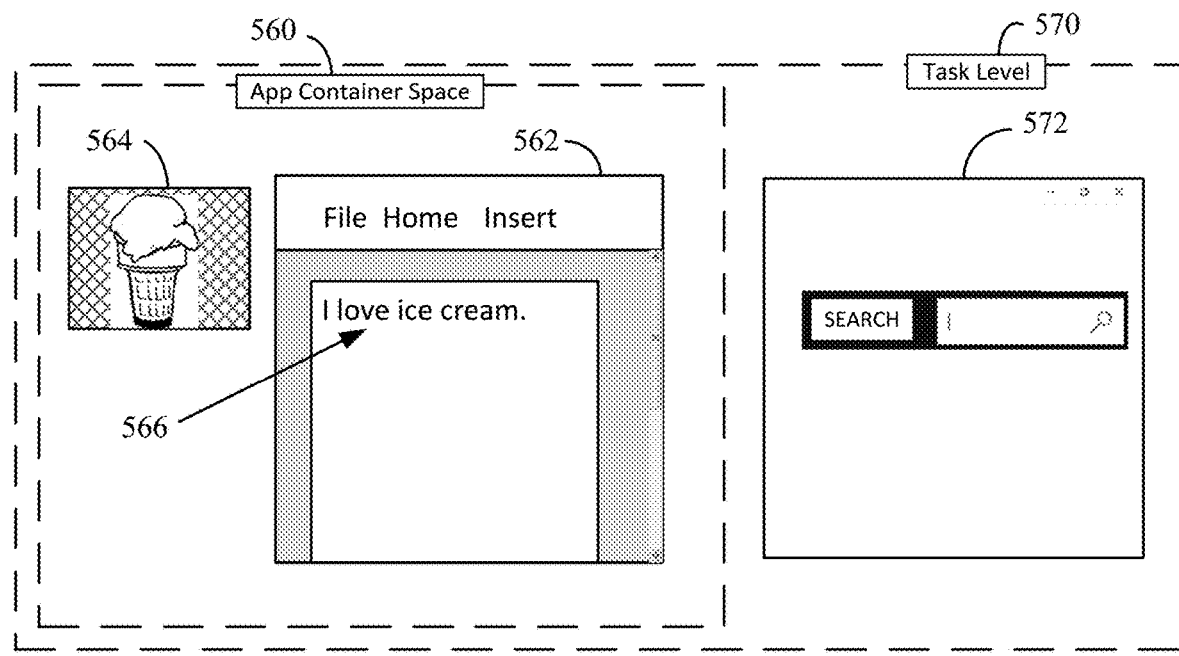

Referring to FIG. 5G, the application container space 560 for the word processing application (e.g., for document 504 of FIG. 5A) can include multiple container elements as the user is interacting with the work processing application in the application container space 560. For example, a main window 562 of a word processing application in one application container element and an image 564 that may be inserted is shown in another application container element to one side of the main window 562 application container element. While working within the application container space 560, for example, entering content 566 of "I love ice cream!", the user may desire to change their interactive mode from application container level to a task level 570, which in this example includes the application container 572 for the web browser application. The processes for changing the interactive mode from the mode the user was in for the application container space to the task level mode may be accomplished such as described with respect to process 400 of FIG. 4A.

Figure 5H:
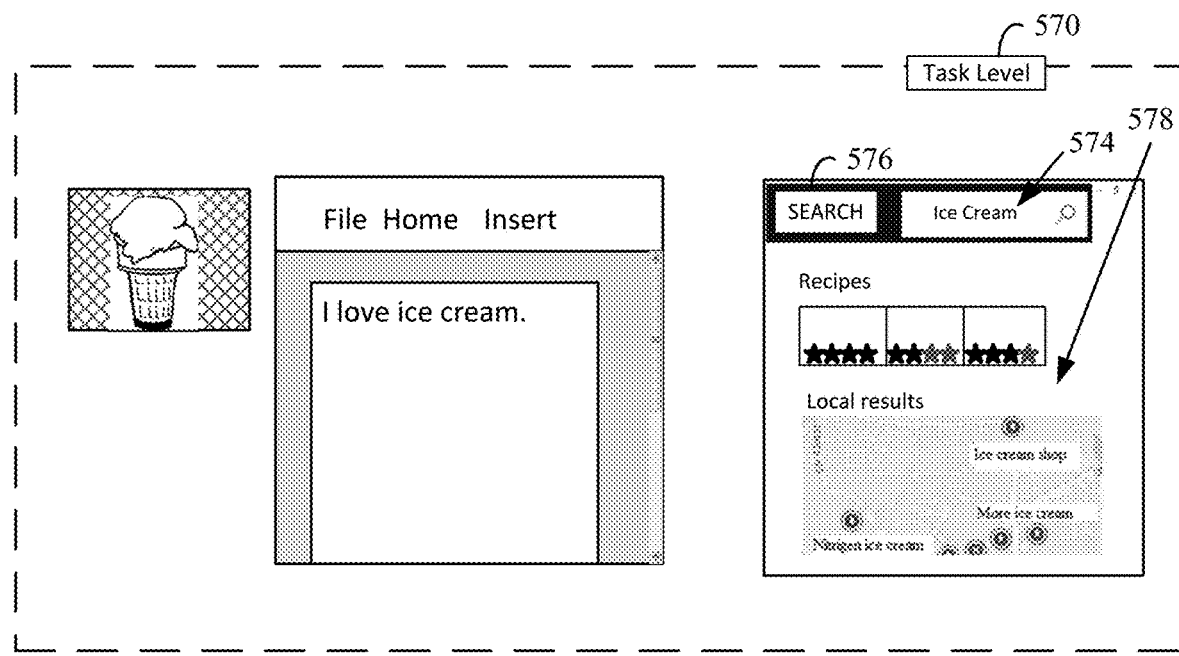

While in the task level 570, the user may interact with the web browser application to perform research for their paper on ice cream, for example, entering a query 574 "ice cream" and performing a search 576, to result in content results 578, as illustrated in FIG. 5H. To reorient herself again on what other tasks may need actions, the user may desire to change the interactive mode to the overview level. The processes for changing the interactive mode from the mode the user was in for the task level 570 to the overview level may be accomplished such as described with respect to process 420 of FIG. 4B, resulting in, for example, the view frame 510C shown in FIG. 5I.

Figure 5I:
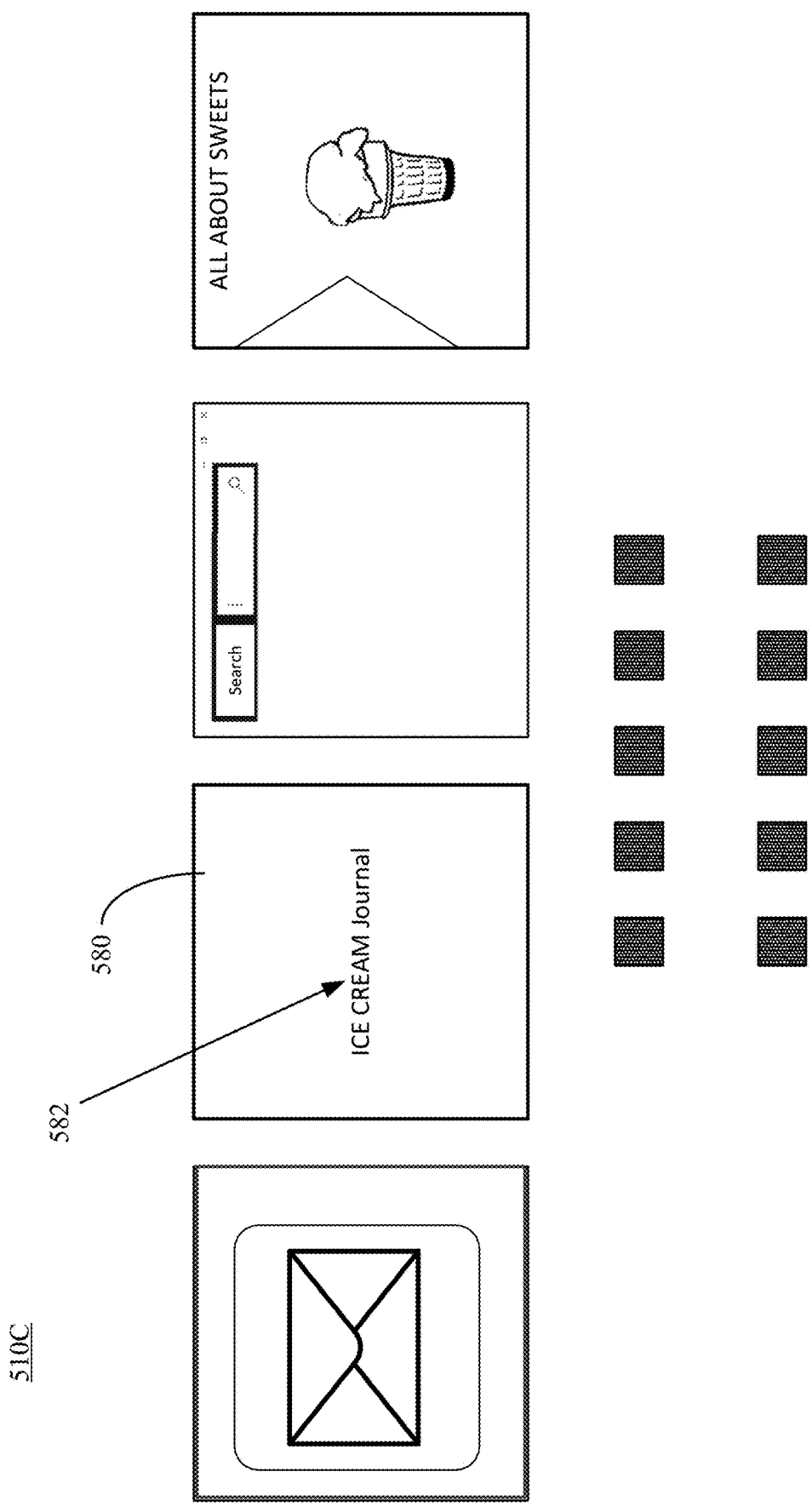

Referring to FIG. 5I, the view frame 510C can include an updated representation 580 for the document 504 of FIG. 5A, which is updated with a label 582 representing the underlying content. The updated label may be determined by the system based on the context, for example, identified in operation 426 of process 420 (or as described with respect to operation 306 of FIG. 3A). In some cases, the representation for the application container for document 504 may be the same as shown in the view frame 510A as shown in FIG. 5B.

Figure 7A:
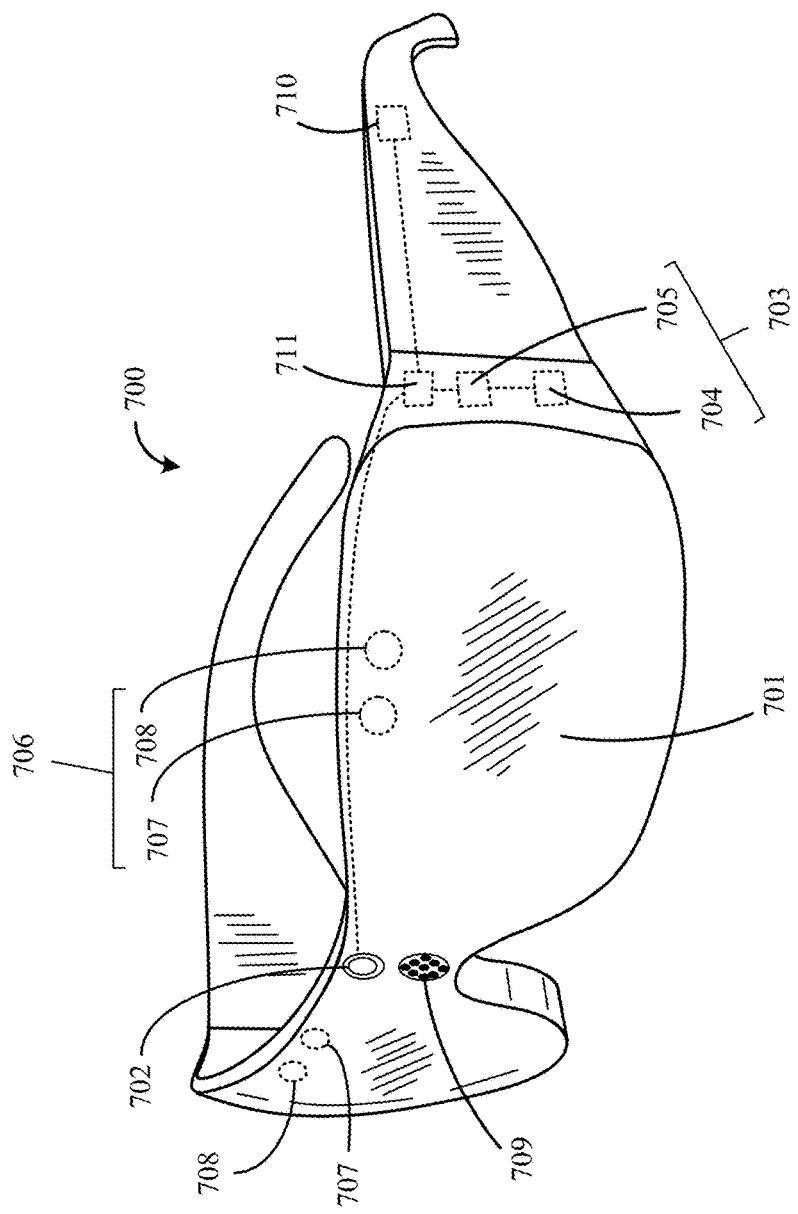
Figure 6:
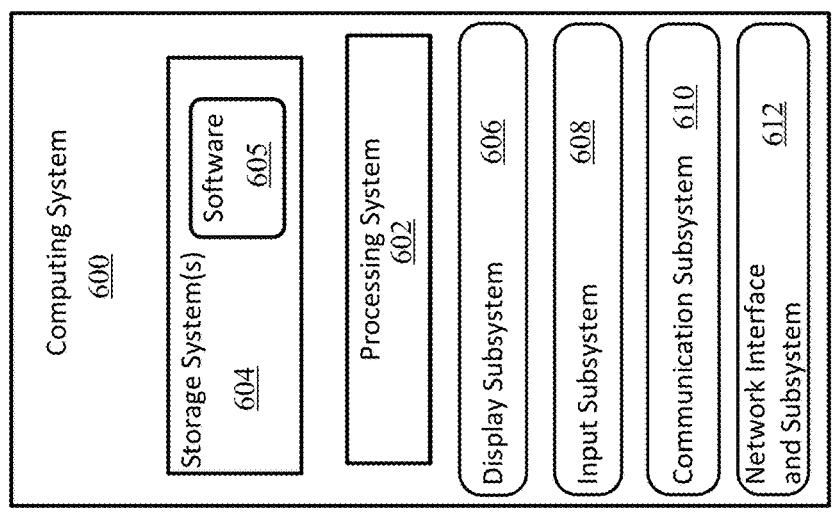
FIG. 6 illustrates an example computing system of a VR device.

FIG. 6 illustrates an example computing system of a VR device; and FIGS. 7A-7C illustrate example head-mounted display-based VR devices that may be used in certain implementations described herein. The illustrated VR devices are wearable computing devices. Wearable computing devices with near-eye displays may also be referred to as "head-mountable displays", "head-mounted displays," "head-mounted devices" or "head-mountable devices." A head-mountable display places a graphic display or displays close to one or both eyes of a wearer. To generate the images on a display, a computer processing system may be used. Such displays may occupy a wearers entire field of view, or only occupy part of wearer's field of view. Further, head-mounted displays may vary in size, taking a smaller form such as a glasses-style display or a larger form such as a helmet, for example.

Referring to FIG. 6, a computing system 600 of a VR device can include a processing system 602, storage system 604 (storing software 605, including instructions for processes 300, 330, 400, 420, 440, and 460), display subsystem 606, input subsystem 608, communication subsystem 610, and network interface and subsystem 612. Depending on implementation, more or fewer of these systems may be included. Referring to FIGS. 7A-7C, a head-mounted display (HMD) can be worn by a user and can generate graphics, such as a view of a virtual space, in a display portion of the HMD. The graphics presented on a head-mounted display can cover a large portion or even all of a user s field of view, providing an immersive experience to the user.

As shown in FIG. 7A, the example head-mounted display-based VR device can take the form of an HMD device 700. The illustrated HMD device 700 implements computing system 600 in the form of wearable glasses or goggles, but it will be appreciated that other forms are possible. The HMD device 700 includes a see-through display subsystem 606 (e.g., an at least partially see-through stereoscopic display) with one or more lenses 701 that may be configured to visually augment an appearance of a physical environment being viewed by the user through the see-through display subsystem such that images may be displayed using lenses 701 (e.g. using projection onto lenses 701, one or more waveguide systems incorporated into the lenses 701, and/or in any other suitable manner).

In some examples, the see-through display subsystem may include one or more regions that are transparent (e.g., optically clear) and may include one or more regions that are opaque or semi-transparent. In other examples, the see-through display subsystem may be transparent (e.g., optically clear) across an entire usable display surface of the see-through display subsystem.

The HMD device 700 includes an optical sensor system 702 that may include one or more optical sensors. In one example, the optical sensor system 702 can include one or more outward facing optical sensors that may be configured to acquire and detect the real-world background and/or physical space from a similar vantage point (e.g., line of sight) as observed by the user through the lenses 701. The optical sensor system 702 may include a variety of sensors, such as one or both of a depth camera/sensor and an RGB camera/sensor. In some cases, a high definition camera or other resolutions for image sensing may be used.

The sensors included with the HMD device 700 can support various functionalities including head tracking to determine the 3D (three-dimensional) position and orientation of the user's head within the physical real-world space; and gaze tracking to ascertain a direction of the user's gaze.

For example, the HMD device 700 can include a position sensor system 703 that may include one or more position sensors 704 such as accelerometer(s), gyroscope(s), magnetometer(s), global positioning system(s) (GPS) 705, multi-lateration tracker(s) (not shown), and/or other sensors that output position sensor information useable as a position, orientation, and/or movement of the relevant sensor.

When position sensor system 703 includes one or more motion sensors 704 (e.g., inertial, multi-axis gyroscopic or acceleration sensors), movement and position/orientation/pose of a user's head may be detected when the user is wearing the system.

The HMD device 700 may further include a gaze detection subsystem 706 configured for detecting a direction of gaze of each eye of a user or a direction or location of focus. Gaze detection subsystem 706 may be configured to determine gaze directions of each of a user's eyes in any suitable manner. For example, in the illustrative example shown, a gaze detection subsystem 706 includes one or more glint sources 707, such as infrared light sources, that are configured to cause a glint of light to reflect from each eyeball of a user, and one or more image sensors 708, such as inward-facing sensors, that are configured to capture an image of each eyeball of the user. Changes in the glints from the user's eyeballs and/or a location of a user's pupil, as determined from image data gathered using the image sensor(s) 708, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 706 may have any suitable number and arrangement of light sources and image sensors. In some implementations, the gaze detection subsystem 706 may be omitted.

The HMD device 700 may include one or more microphones 709 configured to detect sounds, such as voice commands from a user.

Position sensor system 703 (including motion sensors 704), as well as microphone(s) 705 and gaze detection subsystem 706, also may be employed as user input devices, such that a user may interact with the HMD device 700 via gestures of the eye, neck and/or head, as well as via verbal commands in some cases. These systems are represented as input subsystem 608 in FIG. 6.

The HMD device 700 can be configured with one or more audio transducers 710 (e.g., speakers, earphones, etc.) so that audio can be utilized as part of the user experience.

The HMD device 700 can further include a controller 711, which includes components described with respect to computing system 600, such as processing system 602 and storage system 604. Controller 711 can be in communication with the sensors 702, gaze detection subsystem 706, lenses 701, and/or other components through, for example, a communications subsystem 610. The communications subsystem 610 can operate with a network interface and subsystem 612 to facilitate the display system being operated in conjunction with remotely located resources, such as processing, storage, power, data, and services. That is, in some implementations, an HMD device can be operated as part of a system that can distribute resources and capabilities among different components and subsystems.

The HMD device 700 may include instructions stored on the storage system 604 for image production that direct the HMD device 700 to display virtual objects to the user, which are visually superimposed onto the physical environment so as to be perceived at various depths and locations. The HMD device 700 may use stereoscopy to visually place a virtual object at a desired depth by displaying separate images of the virtual object to both of the user's eyes. To achieve the perception of depth, the instructions for image product may render the two images of the virtual object at a rendering focal plane of the HMD device 700, such that there is a binocular disparity between the relative positions of the virtual object in the two images. For example, this binocular disparity may be a horizontal disparity where the relative positions of the virtual object in the two images is separated by a distance in the x axis direction. Here, the x axis may be defined as the axis extending to the left and the right relative to the user, the y axis extending upward and downward relative to the user, and the z axis extending forward and backward relative to the user.

The horizontal disparity between the relative positions of the virtual object in the two images will cause the user to perceive that the virtual object is located at a certain depth within the viewed physical environment due to stereopsis. Using this stereoscopy technique, the HMD device 700 may control the displayed images of the virtual objects, such that the user will perceive that the virtual objects exist at a desired depth and location in the viewed physical environment.

Optical sensor information received from the optical sensor system 702 and/or position sensor information received from position sensor system 703 may be used to assess a position and orientation of the vantage point of the at least partially see-through stereoscopic display relative to other environmental objects. In some embodiments, the position and orientation of the vantage point may be characterized with six degrees of freedom (e.g., world-space X, Y, Z, pitch, roll, and yaw). The vantage point may be characterized globally or independent of the real-world background. The position and/or orientation may be determined with an on-board computing system (e.g., controller 711) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

When the position sensor system 703 includes GPS 705, the system can use the GPS 705 to determine a location of the HMD device 700. This may help to identify real world objects, such as buildings, etc. that may be located in the user's adjoining physical environment.

A power management subsystem (not shown) may include one or more batteries and/or protection circuit modules (PCMs) and an associated charger interface and/or remote power interface for supplying power to components in the HMD device 700.

It may be understood that sensors illustrated in, and described with respect to, FIG. 7A are included for the purpose of example and are not intended to be limiting in any manner, as any other suitable sensors and/or combination of sensors may be utilized to meet the needs of a particular implementation of a head-mounted VR device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

FIGS. 7B and 7C illustrate additional configurations of a VR device. Referring to FIG. 7B, a VR device 720 may provide an immersive experience and be in the form of a mask. Referring to FIG. 7C, a VR device 730 can include a slot or holder for receiving a smartphone; and include clips or other means for securing the smartphone to the headset. The VR device can include straps or other structure to secure or attach the VR device to a user's head. The screen of the smartphone would thus be viewable to the user much in the same way as a conventional HMD has an integrated screen. The smartphone can be leveraged to support the VR applications and provide any of the computing elements described with respect to FIG. 6.

It is to be understood that the VR devices may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

As mentioned above, computing system 600 can implement a VR device, including, but not limited to HMD device 700 and devices 720 and 730. Computing system 600 includes a processing system 602, which can include a logic processor (and may even include multiple processors of same or different types), and a storage system 604, which can include volatile and non-volatile memory.

Processing system 602 may include one or more physical processors (hardware) configured to execute software instructions. Additionally or alternatively, the logic processor may include one or more hardware logic circuits or firmware devices configured to execute hardware-implemented logic or firmware instructions. Processors of the processing system 602 may be single-core or multi-core, and the instructions executed thereon may be configured for sequential, parallel, and/or distributed processing. Individual components of the processing system 602 optionally may be distributed among two or more separate devices, which may be remotely located and/or configured for coordinated processing. Aspects of the processing system 602 may be virtualized and executed by remotely accessible, networked computing devices configured in a cloud-computing configuration. In such a case, these virtualized aspects are run on different physical logic processors of various different machines, it will be understood.

Processing system 602 includes one or more physical devices configured to execute instructions. The processing system 602 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. When the instructions are software based (as opposed to hardware-based such as implemented in a field programmable gate array (FPGA) or digital logic), the instructions can be stored as software 605 in the storage system 604.

Storage system 604 may include physical devices that are removable and/or built-in. Storage system 604 can include one or more volatile and non-volatile storage devices such as optical memory (e.g., CD, DVD, HD-DVD, Blu-Ray Disc, etc.), semiconductor memory (e.g., RAM, SRAM, DRAM, ROM, EPROM, EEPROM, FLASH memory, etc.), and/or magnetic memory (e.g., hard-disk drive, floppy-disk drive, tape drive, MRAM, etc.), or other mass storage device technology. Storage system 604 may include dynamic, static, read/write, read-only, random-access, sequential-access, location-addressable, file-addressable, and/or content-addressable devices. It should be understood that a storage device or a storage medium of the storage system includes one or more physical devices and excludes propagating signals per se.

Aspects of processing system 602 and storage system 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage system 604. This visual representation may take the form of a graphical user interface (GUI). As the herein described methods and processes change the data held by the storage system, and thus transform the state of the storage system, the state of display subsystem 606 may likewise be transformed to visually represent changes in the underlying data. Display subsystem 606 may include one or more display devices utilizing virtually any type of technology. Such display devices may be combined with processing system 602 and/or storage system 604 in a shared enclosure, or such display devices may be peripheral display devices. The at least partially see-through display of HMD 500 described above is one example of a display subsystem 606.

When included, input subsystem 608 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to FIG. 7A and/or any other suitable sensor.

When included, network interface and subsystem 612 may be configured to communicatively couple computing system 600 with one or more other computing devices. Network interface and subsystem 612 may include wired and/or wireless communication devices compatible with one or more different communication protocols. As non-limiting examples, the network interface and subsystem 612 may be configured for communication via a wireless telephone network, or a wired or wireless, near-field, local- or wide-area network. In some embodiments, the network interface and subsystem 612 may allow computing system 600 to send and/or receive messages to and/or from other devices via a network such as the Internet.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer readable storage media having instructions stored thereon that when executed by a processor, direct the processor to:
provide at least three container levels of views for a plurality of application containers of a virtual reality environment, the at least three container levels of views comprising an application container level, a task level, and an overview level,
wherein:
the application container level comprises an application container of the plurality of application containers, the application container being associated with a particular application operating within a particular application container space in the virtual reality environment, the particular application container space being interactive and displayed in a view frame of a virtual reality device such that the particular application container space is the only application container space within the view frame when a current mode view is the application container level,
the task level comprises a grouping of two or more application containers of the plurality of application containers, each of the two or more application containers of the plurality of application containers being associated with an application operating within a corresponding application container space in the virtual reality environment, the two or more corresponding application container spaces being interactive and displayed in the view frame of the virtual reality device such that the two or more application container spaces are the only application container spaces within the view frame when the current mode view is the task level, and
the overview level comprises the plurality of application containers, each of the plurality of application containers being associated with an application operating within an application container space in the virtual reality environment, wherein the plurality of application containers is displayed as thumbnails in the view frame of the virtual reality device when the current mode view is the overview level,
wherein each application container space in the application container level and the task level provides an area for document viewing and editing;
cause display of the current mode view of a current container level in the view frame of the virtual reality device, the current mode view comprising a current mode rule for an application container space,
receive an overview command trigger;
in response to receiving the overview command trigger:
determine context including the current container level;
when the current container level can expand at least one level, sequentially expand to a next mode view, wherein the next mode view is a next expanded container level comprising at least one additional application container; and
    apply a next mode rule for the application container space;
receive a focus command trigger; and
in response to the focus command trigger:
    identify a region of interest in the next mode view;
    adjust the view frame to the region of interest;
    cause display of a focused mode view in the view frame of the virtual reality device;
and
    apply a focused mode rule for the application container space.

2. The one or more computer readable storage media of claim 1, wherein the overview level further comprises an interactive element.

3. The one or more computer readable storage media of claim 1, wherein the current container level is the application container level, wherein the current mode view comprises the particular application container space expanded in the view frame, the particular application container space comprising the application container associated with the particular application, wherein the current mode rule for the particular application container space comprises:
    operating the particular application within the particular application container space and stopping operation of any applications in application container spaces not in the view frame determined based on head motion, wherein the next expanded container level is the task level.

4. The one or more computer readable storage media of claim 3, wherein the particular application container space comprises at least one application container element of the application container in the view frame.

5. The one or more computer readable storage media of claim 1, wherein the current container level is the task level, wherein the current mode view comprises a task level space comprising the two or more corresponding application container spaces, wherein each of the at least two application container spaces comprises at least one application container element in the view frame with a corresponding associated application operating therein, wherein the next expanded container level is the overview level.

6. The one or more computer readable storage media of claim 5, wherein the current mode rule for the application container space comprises:
    operating the corresponding associated application within each of the two or more corresponding application container spaces and stopping operation of any applications in application container spaces not in the view frame determined based on head motion.

7. The one or more computer readable storage media of claim 1, wherein the current container level is the overview level, wherein the current mode rule for the overview space level comprises:
    reducing or stopping operation of any applications within the application container spaces.

8. The one or more computer readable storage media of claim 7, wherein the current mode rule for the overview level further replaces content in each application container space with a corresponding thumbnail of a representational image.

9. The one or more computer readable storage media of claim 1, wherein the instructions to identify the region of interest direct the processor to:
    monitor head motion to identify a region of interest based on position of head; and
    provide a signal to indicate to a user the identified region of interest.

10. The one or more computer readable storage media of claim 1, further comprising instructions to:
    in response to a head lock command, cause the virtual reality device to maintain the view frame regardless of head position of a user; and
    in response to a world lock command, cause the virtual reality device to maintain the application container space within the view frame while permitting head motion tracking within the application container space.

11. A method comprising:
executing a plurality of applications, each of the plurality of applications executing within an application container space in a virtual reality environment;
providing at least three container levels of views for a plurality of application containers, the at least three container levels comprising an application container level, a task level, and an overview level,
wherein:
    the application container level comprises an application container of the plurality of application containers, the application container being associated with a particular application of the plurality of applications operating within a particular application container space in the virtual reality environment, the particular application container space being interactive and displayed in a view frame of a virtual reality device such that the particular application container space is the only application container space within the view frame when a current mode view is the application container level,
    the task level comprises a grouping of two or more application containers of the plurality of application containers, each of the two or more application containers of the plurality of application containers being associated with an application operating within a corresponding application container space in the virtual reality environment, the two or more corresponding application container spaces being interactive and displayed in the view frame of the virtual reality device such that the two or more application container spaces are the only application container spaces within the view frame when the current mode view is the task level, and
    the overview level comprises the plurality of application containers, each of the plurality of application containers being associated with an application operating within an application container space in the virtual reality environment, wherein the plurality of application containers is displayed as thumbnails in the view frame of the virtual reality device when the current mode view is the overview level;
causing display of, at the application container level, the current mode view in a view frame, wherein the current mode view comprises an application container space and an application container level rule for the application container space;
receiving an overview command trigger;
in response to receiving the overview command trigger:
    determining context, including that the current mode view is at the application container level; and
    sequentially expanding to a next level view, wherein the next level view is a task level view at the task level; and
causing display of, at the task level, the task level view in the view frame.

12. The method of claim 11, wherein the application container level rule comprises:
 operating the particular application within the particular application container space and stopping operation of any applications in application container spaces not in the view frame determined based on head motion.

13. The method of claim 11, wherein the task level view comprises:
 the two or more corresponding application container spaces comprising the particular application container space for the application container associated with the particular application of the plurality of applications and a second application container space for a second application container associated with a second application of the plurality of applications,
 a task level rule, wherein the task level rule comprises operating the particular application of the plurality of applications within the particular application container space, operating the second application of the plurality of applications within the second application container space, and stopping operation of any applications in application container spaces not in the view frame determined based on head motion.

14. The method of claim 11, further comprising:
 receiving a second overview command trigger;
 in response to receiving the second overview command trigger, determining second context, including that the current mode view is at the task level; and
 sequentially expanding to a next level view, wherein the next level view is an overview level view comprising:
 the plurality of application container spaces; and
  an overview level rule, wherein the overview level rule comprises reducing or stopping operation of any of the plurality of applications; and
  causing display of, at the overview level, the overview level view in the view frame.

15. The method of claim 14, further comprising:
 receiving a focus command trigger;
 in response to receiving the focus command trigger, identifying a region of interest; and
 adjusting the view frame to the region of interest; and
 causing display of, at a prior level, a prior level view with respect to the region of interest in the view frame.

16. The method of claim 15, wherein the prior level view is the task level view comprising:
 the two or more corresponding application container spaces comprising an application container space for an application container associated with one application of the plurality of applications and a second application container space for a second application container associated with a second application of the plurality of applications; and
 a task level rule, wherein the task level rule comprises operating the one application of the plurality of applications within the application container space, operating the second application of the plurality of applications within the second application container space, and stopping operation of any applications in application container spaces not in the view frame determined based on head motion.

17. The method of claim 15, wherein the prior level view is the application container level view comprising:
 the particular application container space of the particular application, the particular application being one application of the plurality of applications corresponding to the region of interest; and
 the application container level rule for the particular application container space, wherein the application container level rule comprises:
 operating the one application of the plurality of applications within the particular application container space and stopping operation of any applications in application container spaces not in the view frame determined based on head motion.

18. A virtual reality device, comprising:
 a processor;
 head-tracking sensors;
 one or more computer-readable storage media;
 instructions for an application container space feature stored on the one or more computer-readable storage media that, when executed by the processor, direct the processor to at least:
 provide at least three container levels of views for a plurality of application containers of a virtual reality environment, the at least three container levels comprising an application container level, a task level, and an overview level,
 wherein:
  the application container level comprises an application container of the plurality of application containers, the application container being associated with a particular application operating within a particular application container space in the virtual reality environment, the particular application container space being interactive and displayed in a view frame of a virtual reality device such that the particular application container space is the only application container space within the view frame when a current mode view is the application container level,
  the task level comprises a grouping of two or more application containers of the plurality of application containers, each of the two or more application containers of the plurality of application containers being associated with an application operating within a corresponding application container space in the virtual reality environment, the two or more corresponding application container spaces being interactive and displayed in the view frame of the virtual reality device such that the two or more application container spaces are the only application container spaces within the view frame when the current mode view is the task level, and
  the overview level comprises the plurality of application containers and at least one interactive element, each of the plurality of application containers being associated with an application operating within an application container space in the virtual reality environment, wherein the plurality of application containers is displayed as thumbnails in the view frame of the virtual reality device when the current mode view is the overview level;
 receive an overview command trigger;
 in response to receiving the overview command trigger:
  determine context including a current container level;
  when the current container level can expand at least one level, sequentially expand to a next mode view, wherein the next mode view is a next expanded container level comprising at least one additional application container; and
  apply a next mode rule for the application container space;
 receive a focus command trigger; and
 in response to the focus command trigger:

identify a region of interest in the next mode view;
adjust a view frame to the region of interest;
cause display of a focused mode view in the view frame of the virtual reality device; and
apply a focused mode rule for the application container space.

19. The virtual reality device of claim 18, wherein the instructions that identify the region of interest in the next mode view direct the processor to:
determine, using the head-tracking sensors, a head position with respect to an application container.

20. The virtual reality device of claim 18, wherein the instructions to identify the region of interest direct the processor to:
monitor head motion to identify a region of interest based on position of head; and
provide a signal to indicate to a user the identified region of interest.

* * * * *